United States Patent [19]

Coleman et al.

[11] Patent Number: 5,447,206

[45] Date of Patent: Sep. 5, 1995

[54] TRIGGER RETAINER FOR A PORTABLE POWER TOOL

[75] Inventors: Harold J. Coleman, Phoenix; Michael Baker, Chandler, both of Ariz.

[73] Assignee: Ryobi Outdoor Products, Chandler, Ariz.

[21] Appl. No.: 230,629

[22] Filed: Apr. 21, 1994

[51] Int. Cl.$^6$ .............................................. B25F 5/02
[52] U.S. Cl. ...................................... 173/170; 30/276
[58] Field of Search ................... 173/170, 213; 30/276, 30/347, 381, 298; 56/11.1, 11.3

[56] References Cited

U.S. PATENT DOCUMENTS

| | | |
|---|---|---|
| 2,942,507 | 6/1960 | Fischer et al. . |
| 3,140,746 | 7/1964 | LaForce . |
| 3,844,360 | 10/1994 | Green et al. . |
| 3,847,233 | 11/1974 | Glover et al. . |
| 4,841,929 | 6/1989 | Tuggle .............................. 123/198 |
| 4,924,571 | 5/1990 | Albertson .............................. 30/121 |
| 4,989,323 | 2/1991 | Casper et al. ...................... 30/296.1 |
| 4,996,773 | 3/1991 | Albertson .............................. 30/121 |
| 5,241,932 | 9/1993 | Everts .................................. 123/195 |

Primary Examiner—Richard K. Seidel
Assistant Examiner—Jay A. Stelacone
Attorney, Agent, or Firm—Brooks & Kushman

[57] ABSTRACT

A trigger retainer assembly for a portable power tool such as a line trimmer has an internal combustion engine and a workpiece driven by the engine. The trigger retainer assembly includes a housing grippable by an operator, a trigger disposed at least partially in the housing, a throttle cable connected between the engine and the trigger for operating the engine, ignition wires forming at least part of an electrical circuit including the engine and a kill switch, and a molded plastic trigger retainer. The trigger retainer is fastened with a single screw to a lower half of the housing and retains the throttle cable, trigger, ignition wires and kill switch in the housing.

14 Claims, 4 Drawing Sheets

TRIGGER RETAINER FOR A PORTABLE POWER TOOL

TECHNICAL FIELD

This invention relates to portable power tools, and more particularly to a retainer for holding a throttle trigger, a kill switch, ignition wires, and a throttle cable in place in a housing of the power tool.

BACKGROUND ART

Portable power tools such as line trimmers are normally powered by electric motors or small, typically single cylinder internal combustion engines. In either case, some mechanism is usually provided by which the operating speed of the motor or engine, and thus the operating speed of the workpiece driven by the motor or engine, can be increased and decreased by an operator of the power tool. Often, this mechanism takes the form of a trigger that may be depressed or squeezed by the operator. For example, U.S. Pat. No. 3,844,360 to Green et al. shows a chain saw powered by a two cycle engine and having two independently operable triggers. When either of the triggers is squeezed, it operates a throttle lever on the engine.

Portable power tools having internal combustion engines are also often provided with some means for ceasing operation of the engine when the operator no longer desires to work with the unit. One popular method of accomplishing this is through the use of an on/off or kill switch which grounds the supply of electricity to the spark plug. The '360 patent to Green et al., for instance, discloses the use of a separate on/off switch in the ignition circuit. Similarly, U.S. Pat. No. 4,286,675 to Tuggle shows a narrow profile power handle for a line trimmer and the like having an ignition kill switch situated near a hand grip portion of a rear handle.

For power tools such as line trimmers in which the engine is normally carried behind the operator, however, an ignition kill switch disposed on or near the engine would require the operator to remove one or both hands from their normal operating positions in order to manipulate the switch. However, if the manual actuators for the engine throttle and the kill switch are mounted proximate the operator's hands, then some provision must be made for retaining both the actuators themselves and their linkages with the engine in a cover or housing situated between them and the engine. When this cover is removed for servicing, loose components of the assembly are easily lost.

SUMMARY OF THE INVENTION

The present invention is a trigger retainer assembly for a portable power tool having an internal combustion engine. The trigger retainer assembly comprises a housing grippable by an operator, a trigger, a throttle cable, ignition wires, and a trigger retainer. The trigger is disposed at least partially in the housing, while the throttle cable is connected between the engine and the trigger for operating the engine. The ignition wires are also disposed at least partially in the housing, and form at least part of an electrical circuit including the engine and a kill switch. Finally, the trigger retainer is disposed in the housing and retains the throttle cable, trigger, ignition wires and kill switch in the housing.

Accordingly, it is an object of the present invention to provide a trigger retainer assembly of the type described above in which the throttle trigger and cable, as well as the ignition wires leading to and from the kill switch, are retained in a housing situated between the trigger and the engine.

Another object of the present invention is to provide a trigger retainer assembly of the type described above which reduces the chances of misplacing loose parts during servicing.

Another object of the present invention is to provide a trigger retainer for the assembly which is a single, easily moldable plastic piece that is readily assembled with the remainder of the assembly.

Still another object of the present invention is to provide a portable power tool of the type described above incorporates such a trigger retainer assembly.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
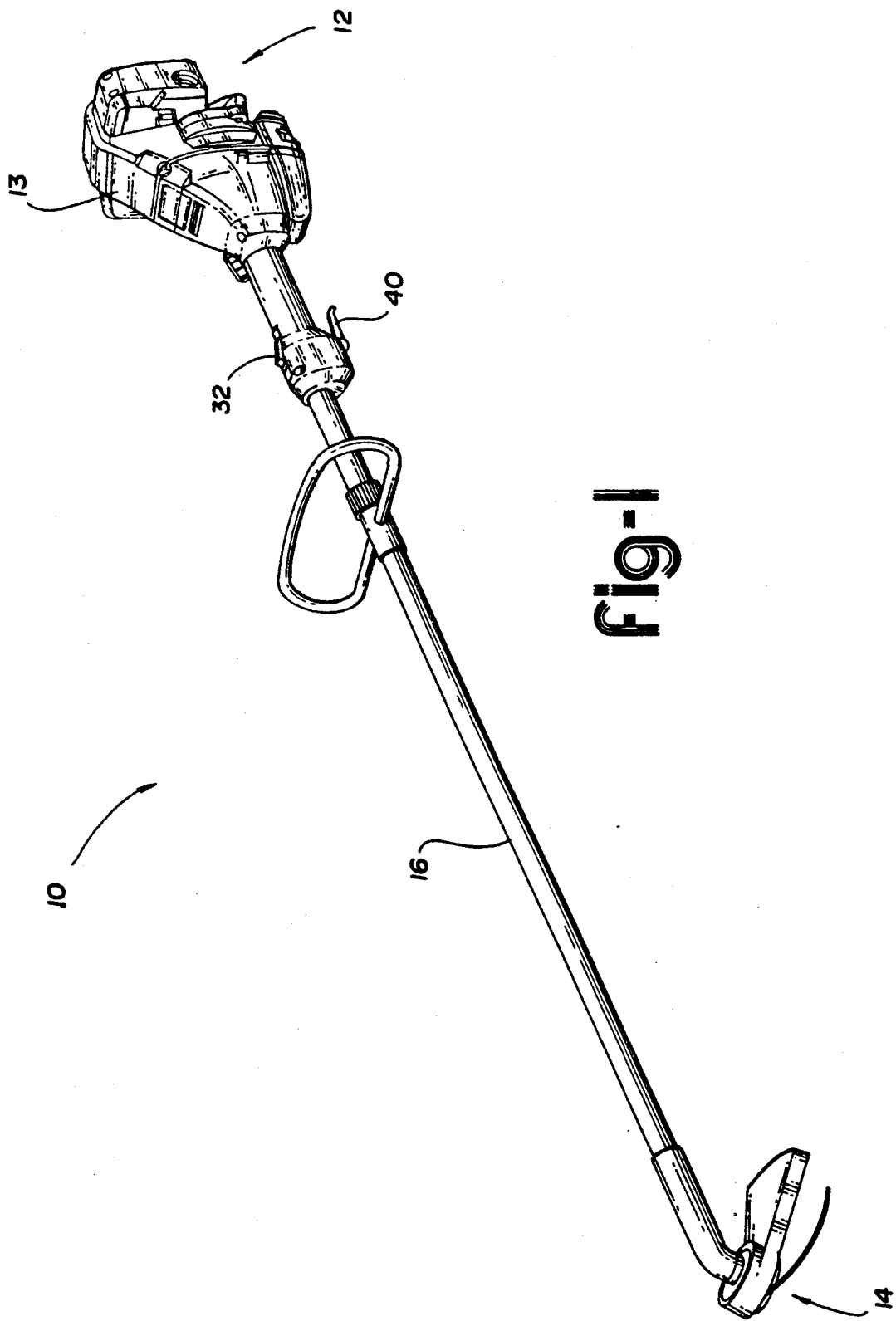
FIG. 1 is a perspective view of a hand held power tool according to the present invention.
Figure 2:
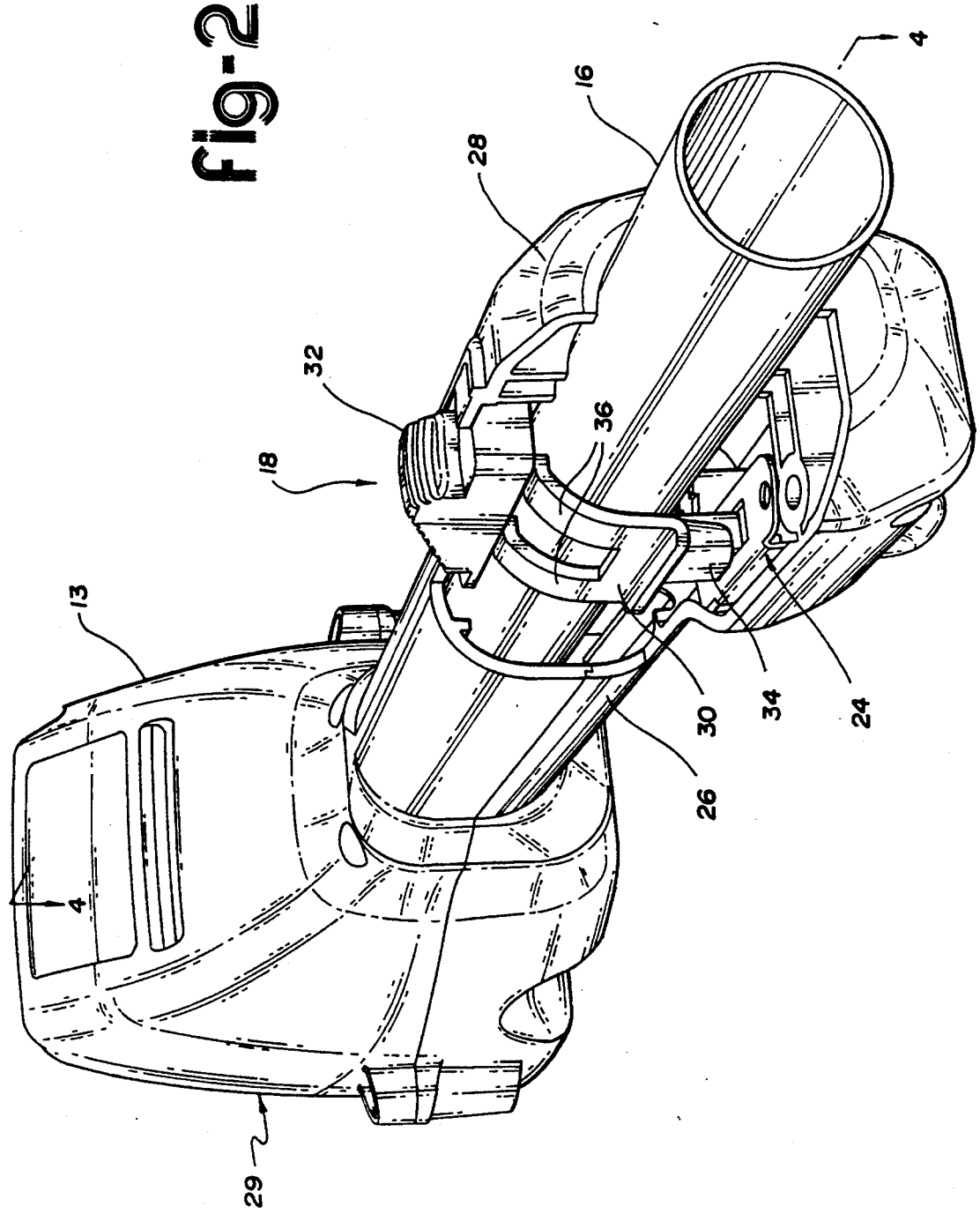
FIG. 2 is a cut away perspective view of a section of the power tool including an actuator assembly for an engine kill switch.

With reference to the drawings, the preferred embodiments of the present invention will be described. FIGS. 1 and 2 show a portable power tool according to the present invention in the form of a line trimmer 10 for use in performing lawn and garden work. The line trimmer 10 includes a single cylinder two- or preferably four-cycle internal combustion engine 12 housed in a power head assembly 13, a workpiece 14 driven by the engine, an elongated tube or boom 16 extending between the engine and the workpiece, and an actuator 18.

An on/off or kill switch 24 is positively mounted under the boom 16 in the lower of two housing halves 26 and 28 which together comprise a housing 29 grippable by at least one of the operator's hands. With the kill switch 24 mounted in a relatively protected position beneath the boom and inside the housing halves, the actuator 18 enables the operator of the power tool 10 to trip the kill switch and thereby to stop the operation of the engine 12. The actuator 18 comprises a collar 30, a fingerpiece or thumbpiece 32, and an extension 34, all of which are preferably formed as a unitary, injection molded plastic piece. The collar 30 includes opposite depending, relatively flexible legs 36 which slidingly engage both sides of the exterior of the boom 16 such that the collar is disposed therearound. The boom 16 serves to smoothly guide and retain the actuator 18 during assembly and operation of the unit.

The fingerpiece 32 is connected to the top of the collar 30 and is movable with the collar between a first or normal operating position and a second position. In the first position with the fingerpiece 32 slid away from the engine 12, an electrical circuit is closed between the high voltage side of an ignition coil of the engine and an electronic ingition control module such that electricity can be supplied to the engine's spark plug. Further details of this arrangment are disclosed in U.S. patent application Ser. No. 08/096,679, assigned to the assignee of the present invention and hereby incorporated by reference. When the operator wishes to terminate operation of the engine 12, the fingerpiece 32 is simply slid rearwardly toward the engine to move the collar 30.

The extension 34 depends from the collar 30 and is adapted to engage the kill switch 24 such that when the fingerpiece 32 is moved to the second position, the kill switch closes an electrical circuit including the low voltage side of the ignition coil and a ground. This grounds the electrical circuit between the spark plug and the electronic ignition control module, but it should be understood that any other method of interrupting or breaking the supply of electricity is also acceptable. Of course, the actuator and kill switch arrangement is equally applicable to an engine equipped with a conventional magnet to supply electrical current to the spark plug. Because one of the operator's hands normally grips the housing halves 26 and 28 to operate a throttle trigger 40, the fingerpiece 32 is easily accessible and movable in either the forward or rearward directions. Engine operation can thus be terminated without the operator removing his or her hands from their operating positions.

Figure 3:
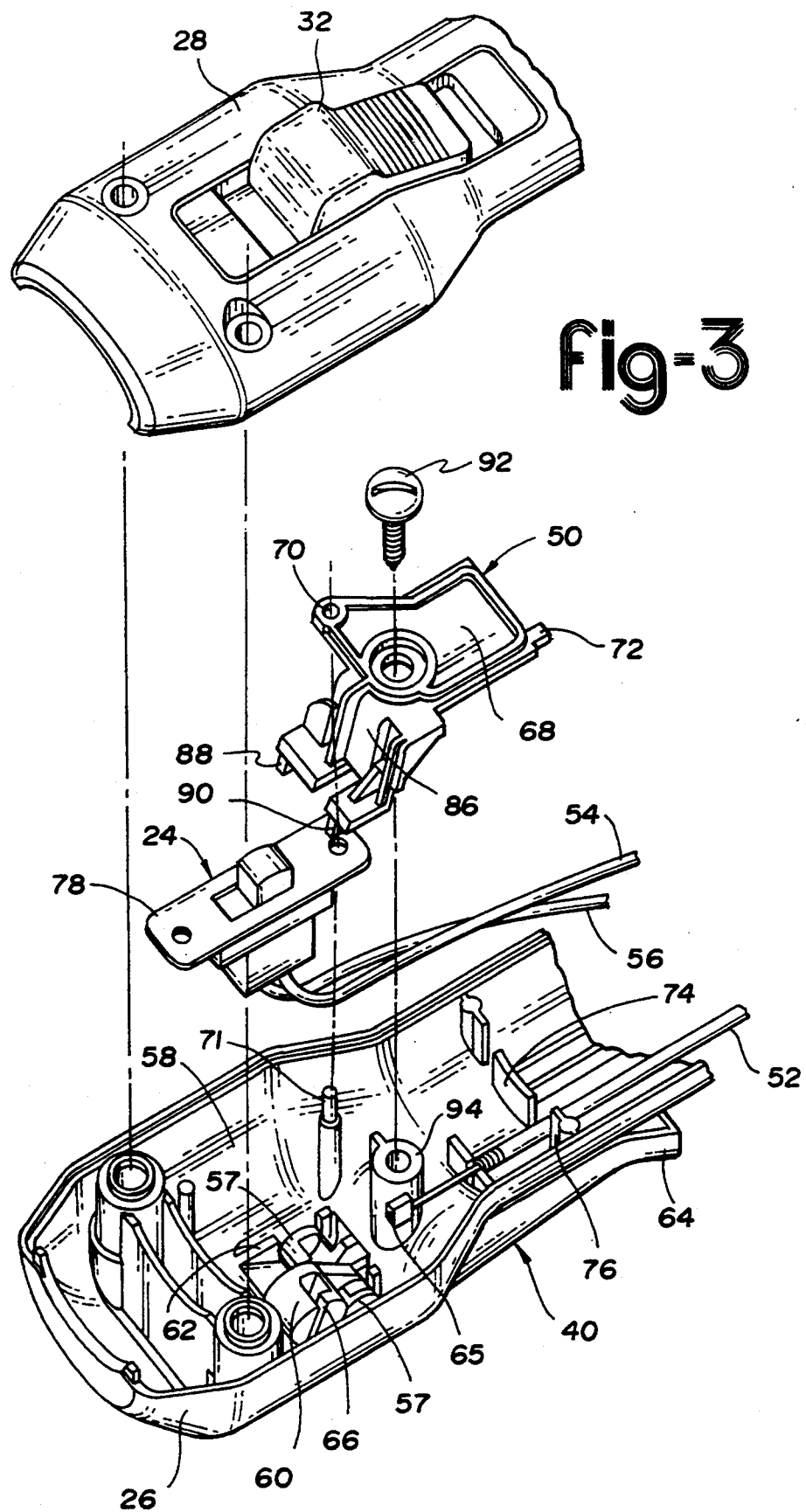
FIG. 3 is an exploded perspective view of a housing section of the power tool including a trigger retainer assembly of the present invention.

FIG. 3 shows a trigger retainer 50 for retaining the throttle trigger 40, a throttle cable 52, ignition wires 54 and 56, and the kill switch 24 in the lower half 26 of the housing 29. The throttle trigger 40 has a pair of laterally projecting circular legs 57 rotatably seated in an indented portion of a recess 58 in the lower housing half 26 about which the throttle trigger is pivotable. The throttle trigger 40 is also provided with an enlarged cylindrical nodule 60 on its upper end that extends into the recess 58 in the lower housing half next to the kill switch 24. One end of a coil spring 62 is seated against the indented portion of the recess 58, and the other end of the coil spring is engaged with the throttle trigger 40 so that the trigger is biased around its pivot point and the distal end 64 of the trigger is biased away from the lower housing half and toward the position where the engine 12 operates at idle speed.

The throttle cable 52 is connected between the throttle (not shown) of the engine 12 and the nodule 60 of the trigger 40 for operating the engine. The end of the throttle cable 52 is provided with an enlarged cast head 65 crimped or otherwise attached thereto which has a cross-section larger than a slot 66 in the nodule 60 such that when the throttle cable 52 is fit through the slot, the throttle cable can be drawn from its normally idle position. Thus, when trigger 40 is squeezed by the operator, the throttle cable extends and the engine throttle is opened to operate the engine 12 at a higher speed. The ignition wires 54 and 56 run to and from the kill switch 24, and form at least part of an electrical circuit that besides the kill switch includes the electronic ignition module and the spark plug of the engine 12.

Figure 4:
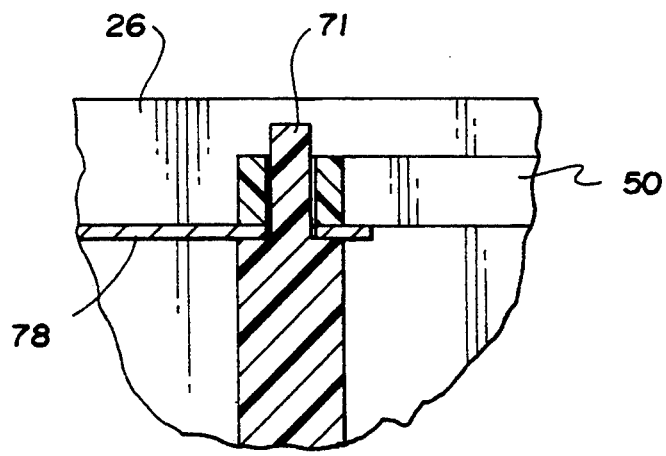
FIG. 4 is a partial cross-sectional view of the trigger retainer assembly.

The trigger retainer 50 is preferably a single molded plastic piece, and is disposed in the housing 29 such that the underside of its flattened portion 68 engages the throttle cable 52 and the ignition wires 54 and 56. To align the trigger retainer 50, a hole 70 therethrough accepts a post 71 projecting from the lower housing half 26 as shown in FIG. 4, and a tab 72 extending from the flattened portion fits into a gap between wall portions 74 and 76 of the lower housing half. A generally planar metallic extension 78 of the kill switch 24 also fits over the post 71 and is seated against an enlarged seat of the post 71 and under the flattened portion 68 of the trigger retainer 50.

Figure 5:
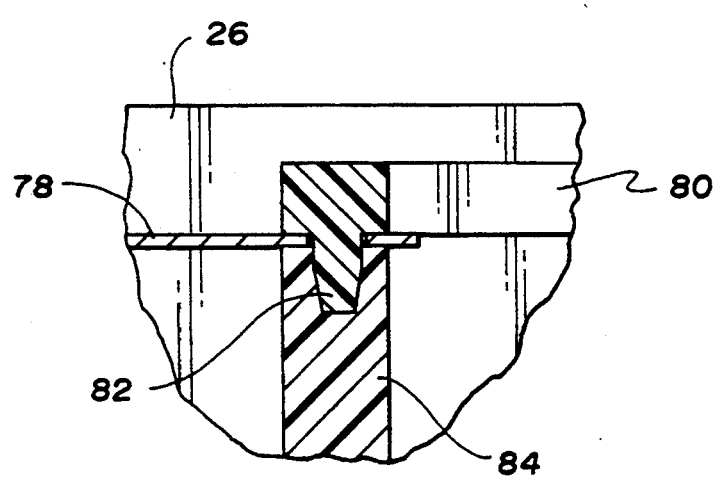
FIG. 5 is another partial cross-sectional view similar to FIG. 4 showing an alternative embodiment of the trigger retainer assembly.

FIG. 5 shows an acceptable alternative embodiment 80 of the trigger retainer in which the trigger retainer is provided with an integral post 82 adapted to extend into a hole in a post 84 extending from the lower housing half 26 to facilitate positioning and alignment of the trigger retainer in the lower housing half.

Referring again to FIG. 3, the trigger retainer 50 has a depending leg 86 provided with a pair of semi-circular notches 88 and 90 at the end thereof adapted for engagement with the circular legs 57 of the throttle trigger 40. The trigger retainer 50 is fastened to the lower housing half 26 by a single fastener such as an ordinary screw 92 which is accepted into a post 94. When the fastener 92 is drawn tightly into the post 94, the underside of the trigger retainer 50 thus locates and retains the throttle cable 52, the throttle trigger 40, the ignition wires 54 and 56, and the kill switch 24 in the lower housing half 26.

The present invention provides a structure with a lower probability of misplacing loose components of the assembly in comparison to prior art designs. For example, an engine starter rope (not shown) can be replaced without disassembly of the handle unit and the attendant chances of lost components or incorrect reassembly.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

We claim:

1. A trigger retainer assembly for a portable power tool having an internal combustion engine, the trigger retainer assembly comprising:
   a housing grippable by an operator;
   a trigger disposed at least partially in the housing;
   a throttle cable connected between the engine and the trigger for operating the engine;
   ignition wires forming at least part of an electrical circuit including the engine and a kill switch; and
   a trigger retainer disposed in the housing and engaging the trigger to retain the throttle cable, trigger, ignition wires and kill switch in the housing.

2. The trigger retainer assembly of claim 1 wherein the trigger retainer is fastened to the housing.

3. The trigger retainer assembly of claim 2 wherein the trigger retainer is fastened to the housing by a single screw.

4. The trigger retainer assembly of claim 1 wherein the trigger retainer comprises a single molded plastic piece.

5. The trigger retainer assembly of claim 1 wherein the housing comprises an upper housing half and a lower housing half.

6. The trigger retainer assembly of claim 5 wherein the trigger retainer is fastened to the lower housing half.

7. A portable power tool comprising:
an internal combustion engine;
a workpiece driven by the engine; and
a trigger retainer assembly including:
- a housing grippable by an operator,
- a trigger disposed at least partially in the housing,
- a throttle cable connected between the engine and the trigger for operating the engine,
- ignition wires forming at least part of an electrical circuit including the engine and a kill switch, and
- a trigger retainer disposed in the housing and engaging the trigger to retain the throttle cable, trigger, ignition wires and kill switch in the housing.

8. The portable power tool of claim 7 wherein the trigger retainer is fastened to the housing.

9. The portable power tool of claim 8 wherein the trigger retainer is fastened to the housing by a single screw.

10. The portable power tool of claim 7 wherein the trigger retainer comprises a single molded plastic piece.

11. The portable power tool of claim 7 wherein the housing comprises an upper housing half and a lower housing half.

12. The portable power tool of claim 11 wherein the retainer is fastened to the lower housing half.

13. The portable power tool of claim 7 wherein the internal combustion engine is a four-cycle engine.

14. The portable power tool of claim 7 wherein the power tool comprises a line trimmer.

* * * * *

UNITED STATES PATENT AND TRADEMARK OFFICE
CERTIFICATE OF CORRECTION

PATENT NO. : 5,447,206
DATED : September 5, 1995
INVENTOR(S) : Coleman, et. al.

It is certified that error appears in the above-indentified patent and that said Letters Patent is hereby corrected as shown below:

Column 3, line 5, delete "ingition" and insert -- ignition --.

Column 6, line 12, before "retainer" insert -- trigger --.

Signed and Sealed this

Thirtieth Day of January, 1996

Attest:

BRUCE LEHMAN

*Attesting Officer*  *Commissioner of Patents and Trademarks*